(No Model.) 2 Sheets—Sheet 1.
F. E. SMITH.
FEED WATER REGULATOR.
No. 387,457. Patented Aug. 7, 1888.
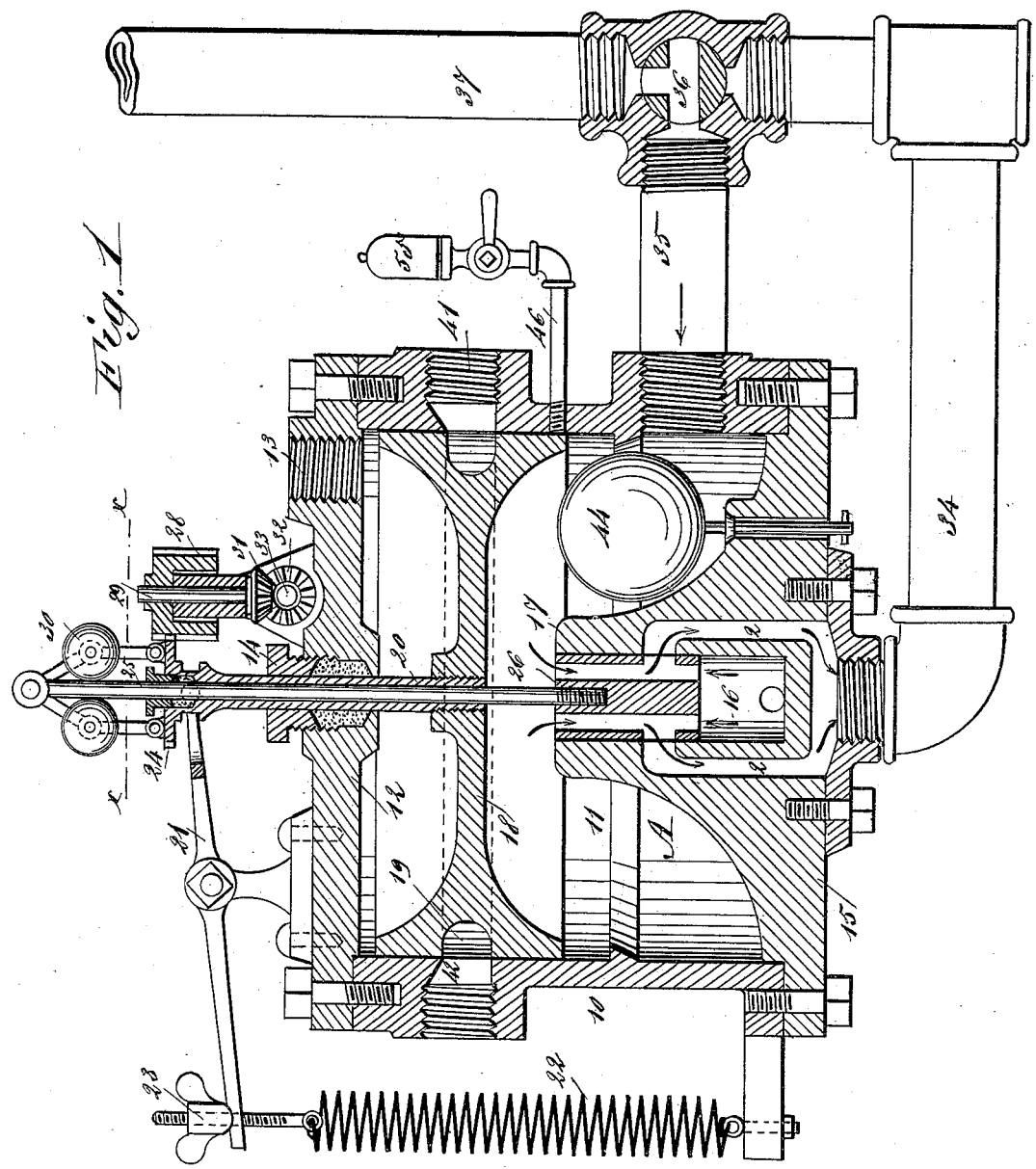
WITNESSES:
C. Neveux
C. Sedgwick
INVENTOR:
F. E. Smith
BY Munn & Co
ATTORNEYS.

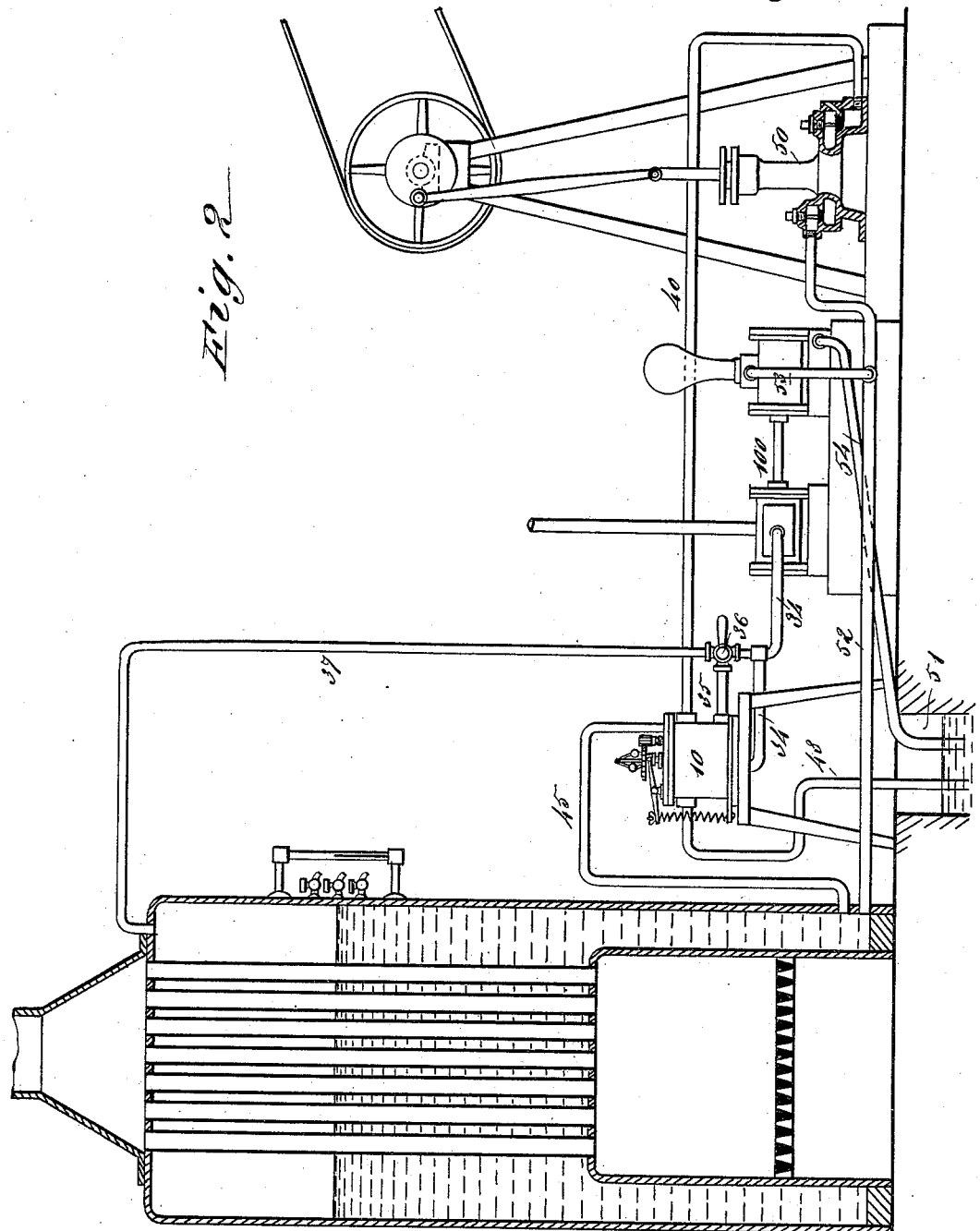

UNITED STATES PATENT OFFICE.

FREDERICK ELLIS SMITH, OF SOUTH BOSTON, MASSACHUSETTS.

FEED-WATER REGULATOR.

SPECIFICATION forming part of Letters Patent No. 387,457, dated August 7, 1888.

Application filed December 6, 1887. Serial No. 257,102. (No model.)

*To all whom it may concern:*

Be it known that I, FREDERICK ELLIS SMITH, of South Boston, in the county of Suffolk and State of Massachusetts, have invented a new and Improved Feed-Water Regulator, of which the following is a full, clear, and exact description.

This invention relates to feed-water regulators, the object of the invention being to provide a single apparatus of simple and inexpensive construction which will act automatically to maintain the water in a boiler at a given desired height.

Reference is to be had to the accompanying drawings, forming a part of this specification, in which similar figures of reference indicate corresponding parts in all the views.

Figure 1 is a central sectional elevation of my improved feed-water regulator. Fig. 2 is a view of the regulator representing the connections between the boiler, the regulator, the steam-pump, and plunger-pumps; and Fig. 3 is a sectional detail view taken on line *x x* of Fig. 1.

In constructing the regulator forming the subject-matter of this application I provide a cylinder, 10, within which there is formed an annular flange, 11, and to which I secure an upper cylinder-head, 12, having a port or opening, 13, and a central stuffing-box, 14, and a lower cylinder-head, 15, in which there is a valve-seat, 16, said seat being formed in a projection, 17, which extends upward within the cylinder. A piston, 18, in the peripheral face of which there is formed a groove, 19, is mounted within the cylinder above the flange 11. The rod or stem of the piston 18, which is shown at 20, is hollow, and extends out through the stuffing-box 14, to be engaged by a lever, 21, that is pivotally mounted upon the head 12, the extending arm of said lever being normally held depressed by a spring, 22, the tension of which is regulated by a winged nut, 23, that engages a threaded stem which passes through the extending arm of the lever 21.

To the upper end of the rod 20 I connect a plate, 24, and through the rod 20 I pass a stem, 25, the lower end of which is connected to a balance-valve, 26, while the upper end is connected to a governor, 30, said governor being supported by the plate 24, the peripheral edge of which plate is cut to the form of a gear which is engaged by a broad-faced pinion, 28, that is rigidly connected to a vertical shaft, 29, which carries a bevel-gear, 31, that is engaged by a corresponding gear, 32, carried by a horizontal shaft, 33, which shaft is in direct communication with the engine and with a plunger-pump operated by the engine.

In the projection 17 there are formed steam-passages 2, which lead to a pipe, 34, that in turn leads to a steam-pump, 100, steam being admitted to the annular chamber A about the projection 17 through a pipe, 35, which communicates by means of a three-way cock, 36, with a pipe, 37, that leads to the boiler, as shown in Fig. 2, the arrangement being such that the pump may be actuated by steam passing through 37 35 into the chamber A, thence through the valve 26, the passages 2, and pipe 34; or, if desired, the pipe 35 may be entirely cut off and steam passed directly from the pipe 37 to the steam-pump, as will be readily understood.

Connection between the cylinder 10 and a plunger-pump, 50, is established by means of a pipe, 40, which leads from the pump to a port, 41, which port is in communication with the annular passage 19 of the piston 18. Upon the opposite side of the cylinder there is a port, 42, which also communicates with the passage 19, and from this port a pipe, 43, leads to a well or hydrant, 51. In the chamber A, I mount a float-valve, 44, which, when the water rises within the chamber, will lift it and permit a portion of the water of condensation to pass outward, as will be understood from an inspection of Fig. 1.

Such being the general construction of my improved feed-water regulator, the operation is as follows: The water within the boiler is raised to about the required level, and the lever 21 is then adjusted so as to stand in about a horizontal line. Then as the water lowers the pressure above the piston will be decreased and the piston will rise to about the position in which it is shown in Fig. 1. At the same time steam will pass to the pump 100, and said pump will act to force the water to the boiler through the pipe 52, to which pipe the pump is connected by a short pipe, 53, the water delivered by the pump 100 being drawn from the well or hydrant 51 through a pipe, 54, this action being continued until sufficient water has been fed into the boiler to cause the piston 18 to drop, the water being led into the chamber above the piston by a pipe, 45, which passes from the port 13 to the water-space of the boiler. As the piston 18 lowers the valve 26 will also lower, providing the engine is standing still, and the ports leading to the passages 2 will be partially closed, thus cutting off the supply of steam from the pump 100. The amount of water delivered by the plunger-pump 50 is regulated by the piston 18, said piston dropping and consequently cutting off the ports 41 and 42 when the water has risen above the required height in the boiler. When the engine is running, it is desirable that the steam-pump should be cut off, and to this end I make the governor connection hereinbefore described, the arrangement being such that as the governor-balls are thrown out by centrifugal motion the valve 26 will be lowered and the steam to the pump 100 cut off.
Should the water at any time become too low in the boiler, the piston 18 will rise so that its lower edge will clear a port in connection with which a pipe, 46, is arranged, said pipe leading to a steam-whistle, 55, by which an alarm will be sounded as the water falls below the required level.

Having thus fully described my invention, I claim as new and desire to secure by Letters Patent—

1. In a feed-water regulator, the combination, with a cylinder, of a piston formed with a groove in its peripheral face, ports formed in the cylinder and communicating with said groove, a water-supply port arranged above the piston, a steam-chamber below the piston, and a steam-regulating valve, substantially as described.

2. In a feed-water regulator, the combination, with a cylinder, of a piston, 18, formed with a groove, 19, a lever by which the piston is normally upheld, a spring arranged in connection with said lever, ports communicating with the passage 19, a steam-chamber formed below the piston, and a steam-regulating valve, substantially as described.

3. In a feed-water regulator, the combination, with a cylinder, of a piston arranged therein and a steam-whistle arranged in connection with the piston, substantially as described.

4. In a feed-water regulator, the combination, with a cylinder, of a piston mounted therein and formed with an annular groove, ports arranged in connection with said groove, a means for supplying water to the chamber above the piston, a means for supplying steam to the chamber below the piston, a steam-valve, 26, a governor, and connections between said governor and the engine, substantially as described.

5. In a feed-water regulator, the combination, with a cylinder formed with a steam-chamber, of a float-valve arranged in connection with said cylinder, substantially as described.

FREDERICK ELLIS SMITH.

Witnesses:
D. F. O'CALLAGHAN,
AMOS CUMMINGS.